(12) United States Patent
Bou-Ghannam et al.

(10) Patent No.: US 8,185,869 B2
(45) Date of Patent: May 22, 2012

(54) SYSTEM AND APPARATUS FOR REAL-TIME DYNAMIC MODIFICATION OF SERVICE-ORIENTED SYSTEMS USING ANNOTATIONS TO SPECIFY REAL-TIME SYSTEM CONSTRAINTS

(75) Inventors: Akram Bou-Ghannam, Lake Worth, FL (US); Vishwanath Narayan, Boca Raton, FL (US); Peeyush Jaiswal, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 668 days.

(21) Appl. No.: 12/264,182

(22) Filed: Nov. 3, 2008

(65) Prior Publication Data

US 2009/0125898 A1 May 14, 2009

Related U.S. Application Data

(63) Continuation of application No. 11/021,402, filed on Dec. 22, 2004, now Pat. No. 7,496,891.

(51) Int. Cl.
*G06F 9/44* (2006.01)
(52) U.S. Cl. ........ 717/111; 717/105; 717/110; 717/168; 715/230; 715/233
(58) Field of Classification Search .................... 717/111
See application file for complete search history.

(56) References Cited

U.S. PATENT DOCUMENTS

| | | | |
|---|---|---|---|
| 5,907,704 A * | 5/1999 | Gudmundson et al. | 717/100 |
| 6,078,747 A * | 6/2000 | Jewitt | 717/164 |
| 6,096,094 A * | 8/2000 | Kay et al. | 717/168 |
| 6,289,362 B1 * | 9/2001 | Van Der Meer | 715/273 |
| 6,539,419 B2 | 3/2003 | Beck et al. | |
| 6,571,295 B1 * | 5/2003 | Sidana | 709/246 |
| 6,718,366 B2 | 4/2004 | Beck et al. | |
| 6,719,366 B2 | 4/2004 | Lane | |
| 6,728,956 B2 * | 4/2004 | Ono | 717/168 |
| 6,973,460 B1 | 12/2005 | Mitra | |
| 7,089,317 B2 * | 8/2006 | Jeyaraman et al. | 709/230 |
| 7,111,076 B2 * | 9/2006 | Abjanic et al. | 709/246 |
| 7,162,542 B2 * | 1/2007 | Abjanic et al. | 709/246 |

(Continued)

OTHER PUBLICATIONS

Pahl et al., "Ontology Support for Web Service Processes," ESEC/FSE'03, Sep. 1-5, 2003, Helsinki, Finland, AVM Digital Library 1-58113-743-5/03-/0009, pp. 208-216, 2003.

(Continued)

*Primary Examiner* — Anna Deng
*Assistant Examiner* — Matthew Brophy
(74) *Attorney, Agent, or Firm* — Cuenot, Forsythe & Kim, LLC

(57) ABSTRACT

A system for modifying an existing standard-based system at runtime can include a computer having an annotation framework layer configured to execute in conjunction with the standard-based system. Responsive to a user request, the annotation framework layer can associate a constraint with a selected message type. The constraint can specify a limitation on information that is requested within a service request type of message. The annotation framework layer can intercept a message exchanged between a client and a Web-based service and apply the constraint. When the intercepted message is a service request type of message, at least one parameter of the intercepted message can be modified to conform with the limitation after the service request is sent from the client and prior to the service request being received by the Web-based service. The message can be stored.

12 Claims, 4 Drawing Sheets

U.S. PATENT DOCUMENTS

| | | |
|---|---|---|
| 7,162,578 B2 * | 1/2007 | Bruner et al. ............... 711/112 |
| 7,246,351 B2 * | 7/2007 | Bloch et al. ................. 717/175 |
| 7,496,891 B2 | 2/2009 | Bou-Ghannam et al. |
| 7,502,822 B2 | 3/2009 | Bou-Ghannam et al. |
| 7,707,564 B2 | 4/2010 | Marvin et al. |
| 2002/0054059 A1 * | 5/2002 | Schneiderman ............ 345/700 |
| 2003/0005181 A1 | 1/2003 | Bau, III et al. |
| 2003/0023957 A1 | 1/2003 | Bau, III et al. |
| 2004/0138946 A1 | 7/2004 | Stolze |
| 2004/0205545 A1 * | 10/2004 | Bargeron et al. ............ 715/512 |
| 2004/0236830 A1 | 11/2004 | Nelson et al. |
| 2005/0021689 A1 | 1/2005 | Marvin et al. |
| 2005/0137850 A1 | 6/2005 | Odell |
| 2005/0222895 A1 * | 10/2005 | Jakobson et al. ............. 705/10 |
| 2006/0136896 A1 | 6/2006 | Bou-Ghannam et al. |
| 2006/0149817 A1 | 7/2006 | Bou-Ghannam et al. |
| 2008/0147841 A1 | 6/2008 | Nishino et al. |
| 2008/0209328 A1 | 8/2008 | Parkinson |
| 2009/0013044 A1 | 1/2009 | Stull |
| 2010/0162222 A1 | 6/2010 | Bou-Ghannam et al. |

OTHER PUBLICATIONS

Ide et al., "International Standard for a Linguistic Annotation Framework," Human Language Technology Conference 8 (2003): 25-30.

Ide et al., "A Common Framework for Syntactic Annotation," Meeting of the Association for Computational Linguistics, (2001): 298-305.

Ling, S., et al., "Constructing Interoperable Components in Distributed Systems," Proceedings of the 32nd TOOLS, Technology of Object-Oriented Languages and Systems, pp. 274-285, Nov. 22-25, 1999.

United States Patent & Trademark Office, "Non-Final Rejection" for U.S. Appl. No. 12/343,863, Dec. 20, 2011, 16 pages.

* cited by examiner

SYSTEM AND APPARATUS FOR REAL-TIME DYNAMIC MODIFICATION OF SERVICE-ORIENTED SYSTEMS USING ANNOTATIONS TO SPECIFY REAL-TIME SYSTEM CONSTRAINTS

CROSS-REFERENCE TO RELATED APPLICATIONS

This is a Continuation of application Ser. No. 11/021,402, filed Dec. 22, 2004 now U.S. Pat. No. 7,496,891, the entirety of which is incorporated herein by reference.

BACKGROUND

1. Field of the Invention

The present invention relates to service-based systems and, more particularly, to dynamically modifying such systems.

2. Description of the Related Art

Service-based software systems utilize an architecture that facilitates the linking of resources in an "on-demand" environment. In general, service-based software systems are configured in accordance with a specified standard. As such, these systems also can be referred to as standard-based systems. In any case, within a service-based system, resources are made available to applications over a network as independent services. These services can be accessed by applications in a standardized way. A service-based architecture provides a more flexible, loose coupling of resources than traditional system architectures.

Despite the advantages of a service-based system, a significant amount of time and effort is required to develop such a system. Generally, a service-based software system is planned, coded, and tested extensively. With successful testing, the system can be deployed to a user base. Deployment refers to the process of ensuring that the system executes properly in the target environment. Deployment typically includes tasks such as installation, configuration, execution, further testing, and implementation of any needed changes to the system for use in the target environment.

The resulting system is intended to satisfy a set of functional and non-functional requirements. Once deployed and in operation, any changes to these requirements necessitate redevelopment of one or more portions of the system. This process can be both time consuming and costly as redesign usually requires further analysis of the system architecture, further testing, and ultimately redeployment.

As service-based architectures continue to evolve, so too has their complexity. System development and redevelopment now require more time, skill, and knowledge on the part of software developers, thereby adding to the overall cost of system development and redevelopment.

It would be beneficial to be able to modify the functionality of an existing service-based software system while avoiding the disadvantages described above.

SUMMARY OF THE INVENTION

The present invention provides a solution for modifying or altering the functionality of an existing standard-based system. One embodiment of the present invention can include a system for modifying an existing standard-based system at runtime. The system can include a computer having an annotation framework layer configured to execute in conjunction with the standard-based system. Responsive to a user request, the annotation framework layer can associate a constraint with a selected message type. The constraint can specify a limitation on information that is requested within a service request type of message. The constraint is not available within the standard-based system. The annotation framework layer can intercept a message exchanged between a client and a Web-based service and apply the constraint. When the intercepted message is a service request type of message, at least one parameter of the intercepted message can be modified to conform with the limitation after the service request is sent from the client and prior to the service request being received by the Web-based service. The message can be stored.

Another embodiment of the present invention can include a system for modifying an existing standard-based system at runtime including a computer having an annotation framework layer configured to execute in conjunction with the standard-based system. Responsive to a user request, the annotation framework layer can associate a constraint with a selected message type. The constraint can specify a limitation upon information that is provided within a service response type of message. The constraint is not available within the standard-based system. The annotation framework layer can intercept a message exchanged between a client and a Web-based service and apply the constraint. When the intercepted message is a service response type of message, data within the message can be modified to conform with the limitation after the service response is sent from the Web-based service and prior to the service response being received by the client. The message can be stored.

Another embodiment of the present invention can include a machine readable storage being programmed to cause a machine to perform the various steps described herein. The machine readable storage can cause the machine to, responsive to a user request, associate a constraint with a message of a selected type of the standard-based system at runtime, wherein the constraint is not a specifiable option within the standard-based system and the constraint specifies a limitation upon information that can be requested within a service request type of message or a limitation upon information provided within a service response type of message. A message between a client and a Web-based service can be intercepted. The constraint can be applied to the intercepted message. Applying the constraint can include, when the intercepted message is a service request type of message, modifying at least one parameter of the intercepted message to conform with the limitation specified by the constraint after the service request is sent from the client and prior to the service request being received by the Web-based service, and, when the intercepted message is a service response type of message, modifying data within the selected message to conform with the limitation specified by the constraint after the service response is sent from the Web-based service and prior to the service response being received by the client. The message can be stored.

BRIEF DESCRIPTION OF THE DRAWINGS

There are shown in the drawings, embodiments that are presently preferred; it being understood, however, that the invention is not limited to the precise arrangements and instrumentalities shown.

DETAILED DESCRIPTION OF THE INVENTION

The present invention provides a solution for dynamically modifying the operation of an existing standard-based system. In accordance with the inventive arrangements disclosed herein, an architecture is provided that allows users to add constraints to messages and/or message parameters within the standard-based system. The constraints are requirements and/or instructions that were not included, specifiable, or part of the existing standard-based system. The messages can be intercepted by an annotation framework layer. Once intercepted, the messages can be interpreted, with any added constraints being applied to the intercepted message in real-time. This allows the functionality of the standard-based system to be modified dynamically by users without having to redevelop the existing system.

Figure 1:
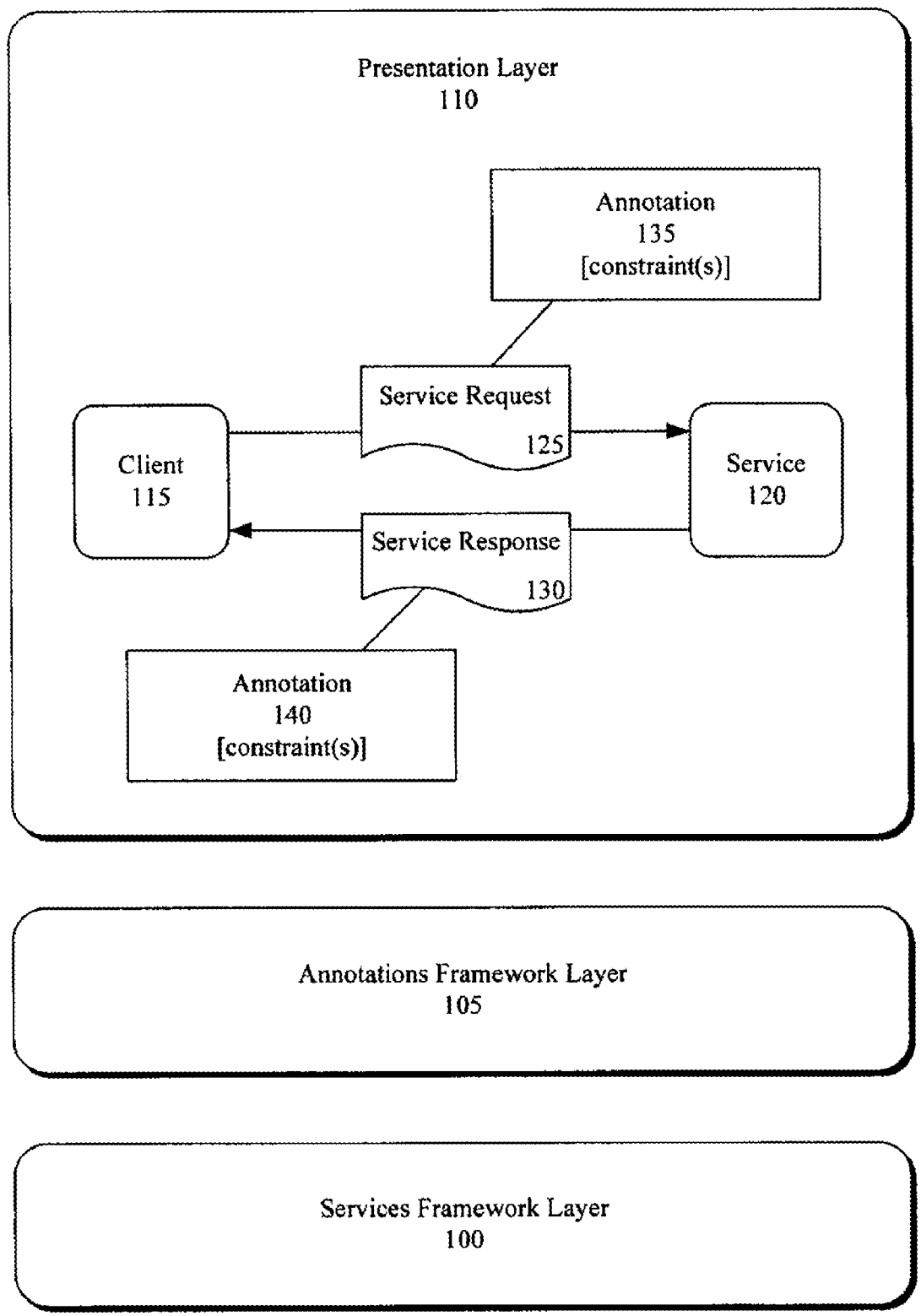
FIG. 1 is a schematic diagram illustrating a system for modifying the functionality of an existing standard-based system in accordance with one embodiment of the present invention.

FIG. 1 is a schematic diagram illustrating a system for modifying the functionality of an existing standard-based system in accordance with one embodiment of the present invention. The system can include a services framework layer 100, an annotations framework layer (AFL) 105, and a presentation layer 110. The services framework layer 100 can be part of the existing standard-based system. As used herein, a standard-based system can be one that utilizes a service oriented architecture (SOA). The standard-based system links with resources, or services, on demand. Services are made available to service requesters, referred to as clients, within a network. The services framework layer 100 provides a standardized way in which clients can access the services.

In one embodiment, the services framework layer 100 can support Web services. Web services are automated software resources that are accessed via the Internet. Typically, a Web service is accessed via its Internet Universal Resource Identifier (URI). Each Web service is described using a Web Services Description Language (WSDL) file. The WSDL file describes how to access the Web service as well as the operations performed by that service.

A WSDL file associated with a Web service describes the service as a set of endpoints operating on messages containing either document-oriented or procedure-oriented information. The operations and messages are described abstractly, and bound to a concrete network protocol and message format to define an endpoint. Related concrete endpoints are combined into abstract endpoints or services. WSDL is extensible to allow description of endpoints and their messages regardless of what message formats or network protocols are used to communicate.

In another embodiment, the services framework layer 100 can support agent-based systems, for example as may be defined by specifications set forth by the Foundation for Intelligent Agents (FIPA). An agent, also referred to as an intelligent agent, is a computer program that gathers information or performs some other service without immediate oversight by a user or other program. Another standard that can be supported by the services framework layer 100 can be one which relies upon autonomic entities. It should be appreciated that the services framework layer 100 can be configured to support any of a variety of different standards, so long as the selected standard provides a mechanism through which the capabilities of the system, i.e. functions, messages, and message parameters, can be exposed or read.

The AFL 105 can operate in conjunction with the services framework layer 100. As such, the AFL 105 can examine any files of the services framework layer 100 that define the capabilities of that system. In the case of a Web services environment, the AFL 105 can access and read WSDL files of the services framework layer 100 to expose or identify functions, messages, and/or message parameters of the standard-based system. As used herein, a message can refer to a service request sent from a client to a service and/or a response sent from a service to a client.

The AFL 105 permits users to add or associate constraints with messages and/or message parameters of the services framework layer 100. While the services framework layer 100 can support different message formats, the AFL 105 allows users to associate messages or message parameters with additional constraints not previously included or defined within the service framework layer 100. That is, the constraints can specify new functionality that is not available within the existing standard-based system. These constraints can be associated with messages and/or message parameters of service requests, service responses, or both.

Once the AFL 105 has exposed the messages and message parameters of the services framework layer 100, the AFL 105 can begin intercepting messages. The AFL 105 can intercept both service requests and service responses. When a message is intercepted by the AFL 105, the constraints added to the message, if any, can be interpreted and applied to the message or to specific parameters of the message.

The presentation layer 110 provides a user interface through which users can specify constraints to be added by the AFL 105 to the existing standard-based system. Through the presentation layer 110, a user can associate a message and/or a message parameter with user-specified constraints through annotations. The presentation layer 110 further can graphically represent the current standard-based system to the user and graphically expose current standard-based system attributes. As such, the presentation layer 110 can graphically represent any constraints that have been added to the existing standard-based system.

As shown, the presentation layer 110 can present a visual representation of a client 115 interacting with a service provider, or service 120. Message flows between the two also are depicted. For example, a request/response transaction can be shown or illustrated through the user interface. Users can select one or more messages from transactions and associate the message(s) and/or message parameters with an annotation. Similarly, users can select a communications link between a client and a service and associate annotations therewith to be applied to any messages exchanged over that link.

In this case, the client 115 has sent a service request 125 to service 120. In response, service 120 has sent a service response 130 to client 115. The user interface indicates that service request 125 has been associated with an annotation 135. Annotation 135 specifies one or more user-added constraint(s) that were not part of the existing standard-based system. In similar fashion, the user interface indicates that the service response 136 has been associated with an annotation 140. Annotation 140 also can specify one or more user-added constraint(s) that were not part of the existing standard-based system.

The constraints can be added to a message or message parameters of an existing standard-based system by a user. That is, the service framework layer 100 can be installed and executing. Use of the AFL 105 and the presentation layer 110 permits a user to dynamically add constraints to messages of the services framework layer 105 thereby changing its functionality. Constraints associated with intercepted messages can be interpreted by the AFL 105 and applied to the messages in real time.

Figure 2:
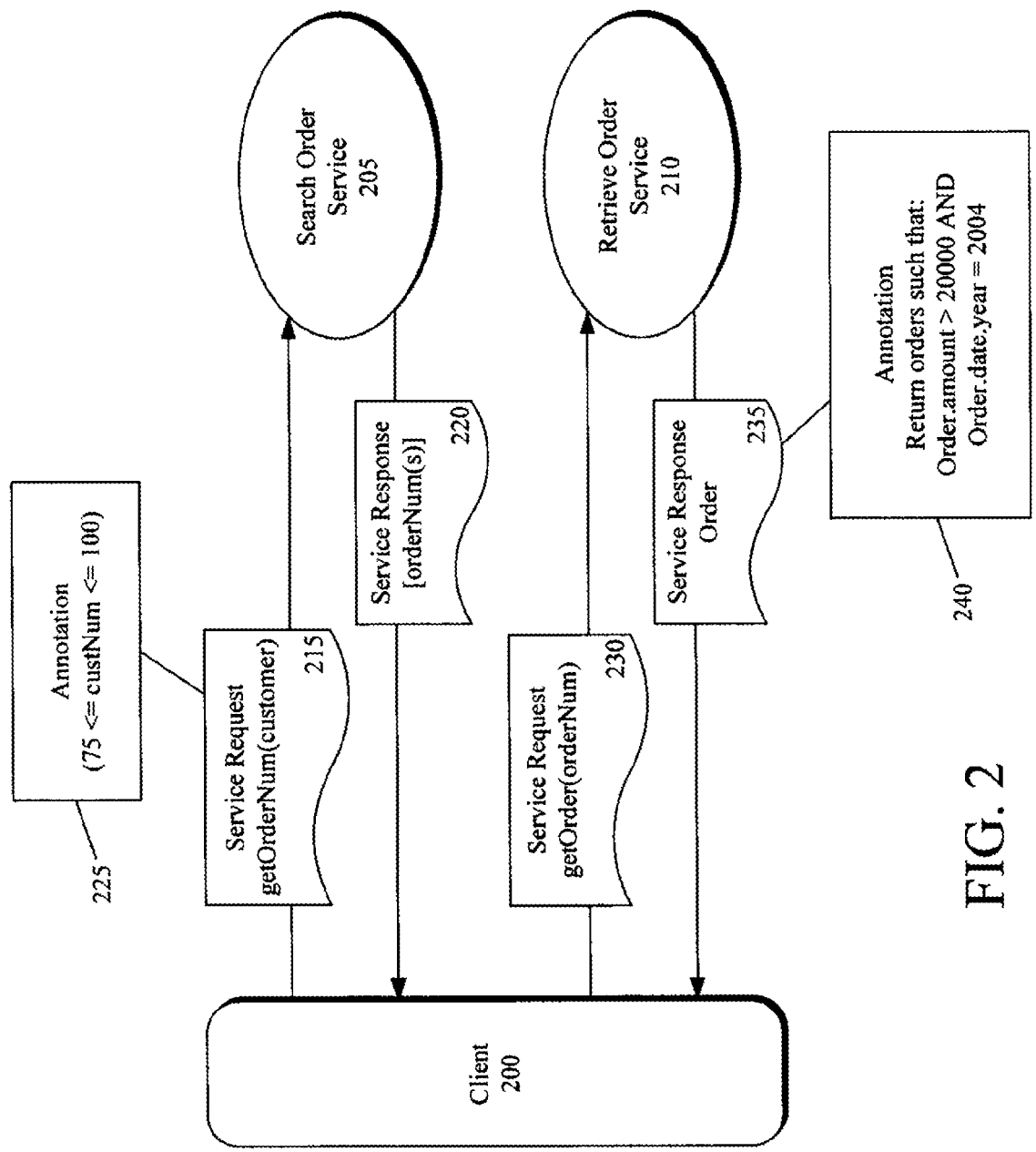
FIG. 2 is a schematic diagram illustrating annotated messages exchanged between a service requester and service provider in accordance with another embodiment of the present invention.

FIG. 2 is a schematic diagram illustrating annotated messages exchanged between a service requester and service providers in accordance with another embodiment of the present invention. The service providers can be located within or external to the network within which the service requestor is located. FIG. 2 depicts the case where a user has dynamically added constraints to messages or message parameters in a standard-based system. For purposes of illustration, FIG. 2 will be described in the context of an order entry system with services relating thereto.

As shown, client 200 is interacting with a search order service 205 and a retrieve order service 210. Search order service 205 can be configured to receive requests for order numbers from client 200 and provide one or more order numbers in response. The retrieve order service 210 can be configured to receive requests for particular order numbers and provide copies of the actual orders identified by the specified order numbers.

In the example of FIG. 2, client 200 has issued a service request 215 to search order service 205. The service request 215 can specify a request to obtain any customer orders that correspond with criteria specified in the request. In this case, however, the existing standard-based system allows a user to specify only a single customer number within the service request 215. Search order service 205 typically receives service request 215 specifying a single customer number and provides any order numbers associated with that customer number to the client 200 via service response 220.

In this case, the user, after the standard-based system has been configured or installed, has annotated service request 215 using the AFL and presentation layer described herein with reference to FIG. 1. The user has dynamically associated service request 215 with an annotation 225 that specifies an additional constraint to be applied to service request 215. The constraint specifies that only orders corresponding to customer numbers within a specified range of customer numbers, i.e. between 75 and 100, can be retrieved. This constraint restricts user access to order numbers associated with customer numbers that fall outside of the specified range. The constraint specified by annotation 225 illustrates how constraints can be used to enforce privacy, security, and/or otherwise restrict user access to information. In such cases, for example, a system administrator can implement the constraints.

Once annotations are specified by the user and associated with a particular message or message parameter, the AFL can intercept service request 215. The AFL checks to ensure that the customer number specified by service request 215 falls within the range of the user-specified constraint of annotation 225. If so, the AFL passes the service request 215 on to search order service 205. If not, the AFL does not pass service request 215 on to search order service 205. Instead, the AFL can notify the user that the customer order specified in service request 215 is not allowed. By associating service request 215, or a parameter of service request 215, with annotation 225, the user has dynamically altered the operation of the existing standard-based system. Upon receipt of service request 215, search order service 205 can retrieve the order numbers associated with the customer number specified by service request 215.

Having received the order numbers in service response 220, client 200 can initiate a further service request 230 to retrieve order service 210. Service request 230 can request a particular customer order identified by the order number. As service request 230 is not annotated, it can pass on to retrieve order service 210 without intervention by the AFL.

As shown, service response 235 from retrieve order service 210 has been associated with an annotation 240. Prior to being annotated, service response 235 would include the actual orders corresponding to the order numbers specified in service request 230. Annotation 240, however, specifies additional constraints to be applied to service response 235. The constraints indicate that only orders of more than $20,000.00 in value which are dated in the year 2004 are to be retrieved.

Because service response 240 was annotated with additional constraints, the AFL can intercept service response 235 and apply the additional constraints to the message. The AFL can process one or more of the results of the service response 240 in accordance with the added constraints. In this case, the AFL can review the retrieved orders and remove or filter those orders from the service response 235 that do not comply with the constraints specified by annotation 240. After processing, the AFL can send the modified service response 235 on to client 200. Were constraints from annotation 240 not applied to service response 235, then all retrieved orders would have been passed to client 200 without regard for date or amount.

FIG. 2 illustrates how a user of an existing standard-based system can dynamically change the behavior of the system by associating messages and/or message parameters with additional constraints. This can be performed dynamically, i.e. after the standard-based system has been compiled, implemented, and/or installed, at runtime without further modification to the system. It should be appreciated that constraints can be implemented and remain in place for a single interaction with a service, for multiple interactions, or until removed.

Figure 3:
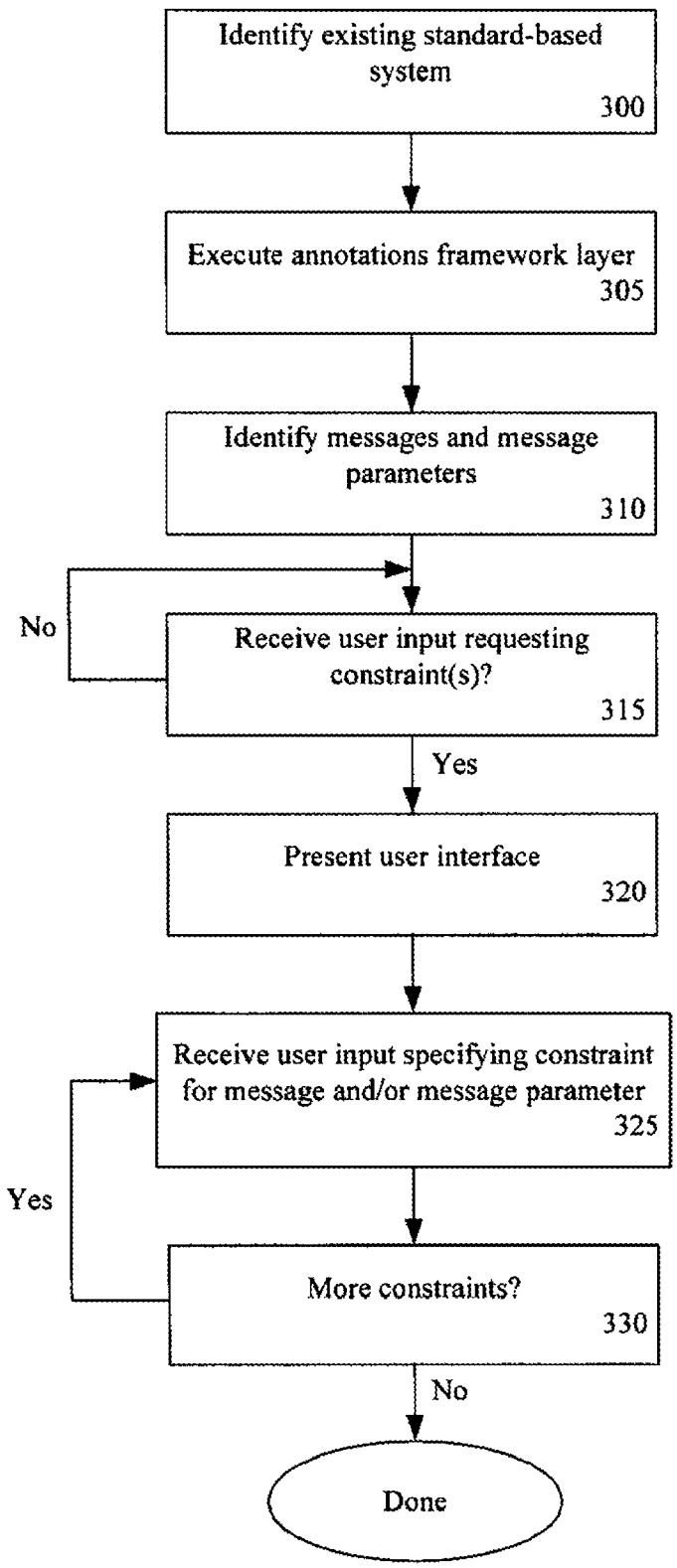
FIG. 3 is a flow chart illustrating a method of adding constraints to an existing standard-based system in accordance with another embodiment of the present invention.

FIG. 3 is a flow chart illustrating a method of dynamically adding constraints to an existing standard-based system in accordance with another embodiment of the, present invention. The method can begin in step 300 where an existing standard-based system is identified. The standard-based system can be pre-installed and/or executing within one or more computer systems.

In step 305, the AFL can be executed. The AFL can execute in conjunction with the standard-based system. In step 310, the AFL can identify messages and message parameters of the standard-based system. As noted, any documents including, but not limited to, WSDL files, can be analyzed to expose the messages and parameters of the messages used within the standard-based system to request services and receive responses from services. With respect to agent-based systems, for example, files formatted in an Agent Communication Language (ACL) which define syntax and semantics for agent interaction can be examined. One example of an ACL can include Knowledge Query Manipulation Language (KQML).

In step 315, a determination can be made as to whether user input requesting the addition of one or more constraints has been received. If so, the method can proceed to step 320. If not, the method can continue to loop through step 315 until such time as an input is received or another event causing the program to exit the loop or end is received (not shown).

In step 320, in the case where a request to add constraints is received, a user interface to the AFL can be presented. In step 325, a user input specifying a constraint for a message parameter can be received. Through the user interface, a user can view messages and individual message parameters. In one embodiment, representations of service request and service response transactions can be presented. The interface allows a user to select a particular message and/or message parameter and associate either with one or more constraints not originally included or specified within the standard-based system.

In step 330, a determination can be made as to whether further constraints are to be associated with message parameters. If so, the method can loop back to step 325 to receive further constraints. If not, the method can end.

Figure 4:
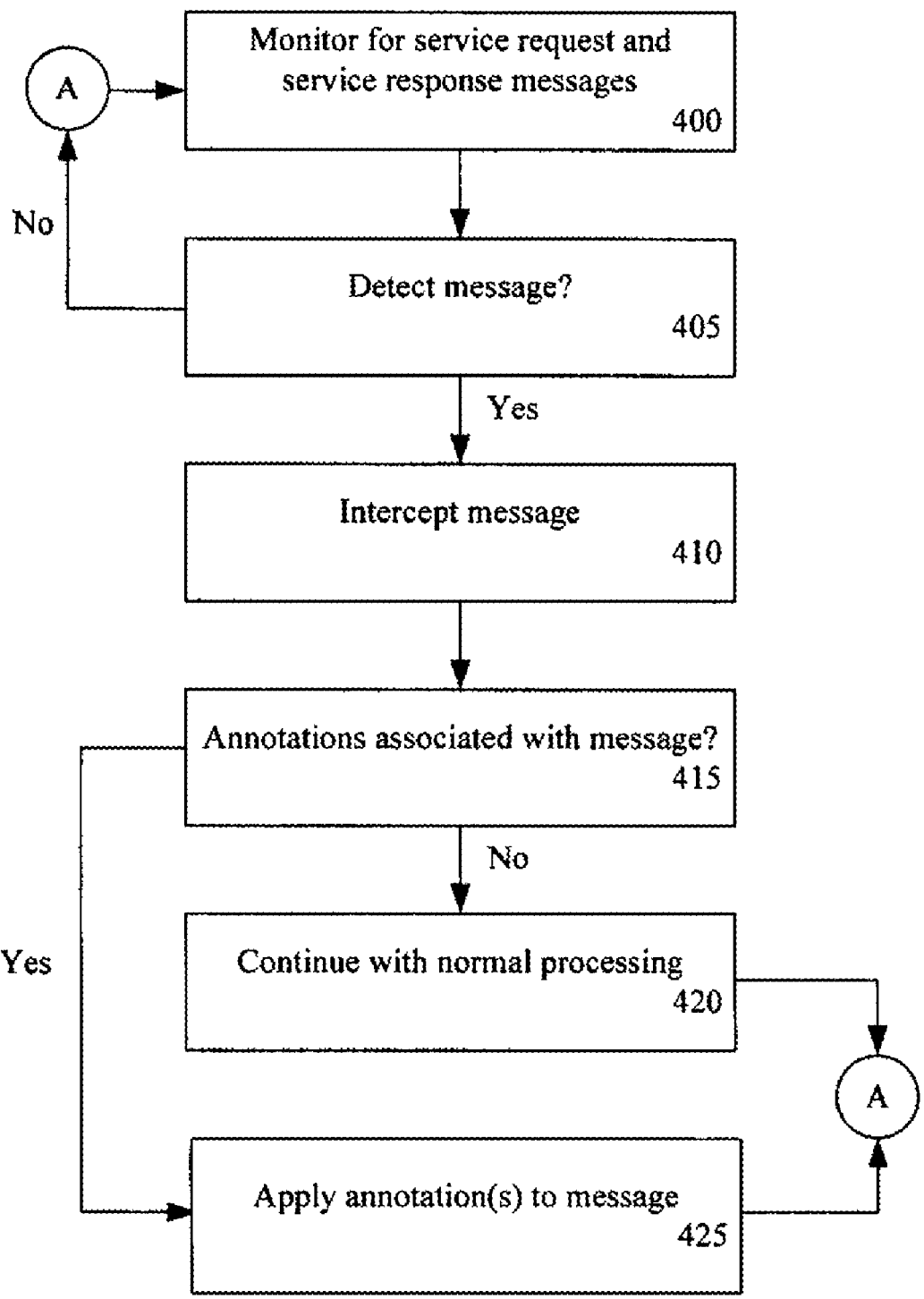
FIG. 4 is a flow chart illustrating a method of processing messages having constraints added thereto in accordance with yet another embodiment of the present invention.

FIG. 4 is a flow chart illustrating a method of processing messages having constraints added thereto in accordance with yet another embodiment of the present invention. The method can begin in a state where the AFL has been configured to operate with an existing standard-based system. In step 400, the AFL can begin monitoring for service request and service response messages.

In step 405, a determination can be made as to whether a message has been detected. If not, the method can loop to step 400 to continue monitoring for messages. If so, the method can proceed to step 410 where the detected message can be intercepted. In step 415, a determination can be made as to whether the message has been associated with an annotation. Requests and responses can be analyzed by the AFL to determine whether the message has been associated with one or more annotations.

If the intercepted message has been associated with an annotation, the method can proceed to step 425. If not, the method can proceed to step 420 where normal processing continues. For example, if the message is a service response, the message can be passed on to the intended client. If the message is a service request, the message can be passed on to the intended service. Continuing with step 420, in the case where the message has been associated with an annotation, any constraints specified by the annotation can be applied to the message. For example, in the case of a constraint that is to be added to a service request, the message parameter, or parameters, affected by the constraint can be modified by the AFL in accordance with the constraint(s). In the case where the constraint applies to a service response, the AFL can process the message to perform any filtering of the results in the service response that may be required in accordance with the constraint(s).

After either step 420 or step 425, the method can continue monitoring for further messages until such time as the AFL is halted or stopped responsive to some other predetermined event.

In another embodiment of the present invention, the AFL can be configured to create new services if so desired by a user. The new services can be built from older or existing services, that may or may not be annotated. A new service can rely upon a combination or ordering of existing services to satisfy new constraints. As viewed through the presentation layer, a new service can appear, or be presented, as a single service rather than as an amalgamation of a plurality of services. Accordingly, new flows can be generated that utilize both new and old services.

The methods described herein have been provided for purposes of illustration. As such, neither should be construed as a limitation of the present invention. For example, one or more of the steps described with reference to FIG. 3 or 4 may be performed in a different order than described herein. Further, the procedures described in FIGS. 3 and 4 can be performed simultaneously such that the system continues to monitor for annotated messages while a user continues to associate new constraints with messages and/or message parameters of the standard-based system.

The inventive arrangements disclosed herein provide a method, system, and apparatus that facilitates the modification of an existing standard-based system. Through the present invention, users can dynamically add constraints to existing system messages and message parameters to alter the functionality of the standard-based system. Such changes can be implemented without having to recompile or redesign the system and can be added by a user at runtime of the standard-based system. Further, users can add constraints to messages in real-time such that annotated messages can be interpreted in real-time.

The present invention can be realized in hardware, software, or a combination of hardware and software. The present invention can be realized in a centralized fashion in one computer system or in a distributed fashion where different elements are spread across several interconnected computer systems. —Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program, program, software, or software application, in the present context, means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A system for modifying an existing standard-based system at runtime comprising:
　a computer comprising a services framework layer configured to support the standard-based system and an annotation framework layer configured to execute in conjunction with the standard-based system, and a presentation layer communicatively linked with the annotation layer;
　wherein the standard-based system provides a mechanism through which capabilities of the standard-based system are exposed or read, wherein responsive to a user request, the annotation framework layer associates a constraint with a selected message type, wherein the constraint specifies a limitation on information that is requested within a service request type of message and the constraint specifies new functionality not specified in the services framework layer;
　wherein the annotation framework layer intercepts a message exchanged between a client and a Web-based service and applies the constraint;
　wherein the presentation layer at run time provides a graphical user interface indicating that the constraint is associated with the message exchanged between the client and the Web-based service;
　wherein when the intercepted message is a service request type of message, at least one parameter of the intercepted message is modified to conform with the limitation specified by the constraint after the service request is sent from the client and prior to the service request being received by the Web-based service; and wherein the message is stored.

2. The system of claim 1, wherein the user interface is configured to receive the user request.

3. The system of claim 1, wherein the presentation layer displays, at runtime of the standard-based system, representations of the client, the standard-based system, the Web-based service providing services to the client, and message types exchanged between the client and the Web-based service.

4. The system of claim 1, wherein the constraint is specified dynamically by a user at runtime of the standard-based system.

5. A system for modifying an existing standard-based system at runtime comprising:

a computer comprising a services framework layer configured to support the standard-based system and an annotation framework layer configured to execute in conjunction with the standard-based system, and a presentation layer communicatively linked with the annotation layer;

wherein the standard-based system provides a mechanism through which capabilities of the standard-based system are exposed or read, wherein responsive to a user request, the annotation framework layer associates a constraint with a selected message type, wherein the constraint specifies a limitation upon information that is provided within a service response type of message and the constraint specifies new functionality not specified in the services framework layer;

wherein the annotation framework layer intercepts a message exchanged between a client and a Web-based service and applies the constraint;

wherein the presentation layer at run time provides a graphical user interface indicating that the constraint is associated with the message exchanged between the client and the Web-based service;

wherein when the intercepted message is a service response type of message, data within the message is modified to conform with the limitation specified by the constraint after the service response is sent from the Web-based service and prior to the service response being received by the client; and wherein the message is stored.

6. The system of claim 5, wherein the intercepted message is a service response, wherein the annotation framework layer processes at least one result specified by the service response in accordance with the constraint.

7. The system of claim 5, wherein the user interface is configured to receive the user request.

8. The system of claim 7, wherein the presentation layer displays, at runtime of the standard-based system, representations of the client, the standard-based system, the Web-based service providing services to the client, and message types exchanged between the client and the Web-based service.

9. The system of claim 5, wherein the constraint is specified dynamically by a user at runtime of the standard-based system.

10. A machine readable storage, having stored thereon a computer program having a plurality of code sections executable by a machine for causing the machine to perform the steps of:

executing a services framework layer configured to support an existing standards based system, wherein the standard-based system provides a mechanism through which capabilities of the standard-based system are exposed or read;

executing an annotation framework layer in conjunction with the standard-based system;

executing a presentation layer communicatively linked to the annotation layer;

responsive to a user request, via the annotation framework layer, associating a constraint with a message of a selected type of the standard-based system at runtime, wherein the constraint is not a specifiable option within the standard-based system and the constraint specifies a limitation upon information that can be requested within a service request type of message or a limitation upon information provided within a service response type of message, and the constraint specifies new functionality not specified in the services framework layer;

via the annotation framework layer, intercepting a message between a client and a Web-based service and applying the constraint to the intercepted message, wherein applying the constraint comprises:

when the intercepted message is a service request type of message, modifying at least one parameter of the intercepted message to conform with the limitation specified by the constraint after the service request is sent from the client and prior to the service request being received by the Web-based service;

when the intercepted message is a service response type of message, modifying data within the selected message to conform with the limitation specified by the constraint after the service response is sent from the Web-based service and prior to the service response being received by the client;

wherein the presentation layer at run time provides a graphical user interface indicating that the constraint is associated with the message exchanged between the client and the Web-based service; and storing the message.

11. The machine readable storage of claim 10, wherein the intercepted message is a service response, said applying step comprising processing at least one result specified by the service response in accordance with the constraint.

12. The machine readable storage of claim 10, further causing the machine to perform the step of, via presentation layer, displaying, at runtime of the standard-based system, representations of the client, the standard-based system, the Web-based service providing services to the client, and the message types exchanged between the client and the Web-based service.

* * * * *